Aug. 20, 1968 A. KUNTKE 3,398,351
HIGH VOLTAGE RECTIFIER ASSEMBLY HAVING TUBULAR
CAPACITOR COMPENSATION MEANS
Filed May 24, 1965 3 Sheets-Sheet 1

INVENTOR.
ALFRED KUNTKE
BY
AGENT

Aug. 20, 1968 A. KUNTKE 3,398,351
HIGH VOLTAGE RECTIFIER ASSEMBLY HAVING TUBULAR
CAPACITOR COMPENSATION MEANS
Filed May 24, 1965 3 Sheets-Sheet 2

INVENTOR.
ALFRED KUNTKE
BY
AGENT

United States Patent Office 3,398,351
Patented Aug. 20, 1968

3,398,351
HIGH VOLTAGE RECTIFIER ASSEMBLY HAVING TUBULAR CAPACITOR COMPENSATION MEANS
Alfred Kuntke, Hamburg-Wellingsbuttel, Germany, assignor to North American Philips Company, Inc., New York, N.Y., a corporation of Delaware
Filed May 24, 1965, Ser. No. 458,324
Claims priority, application Germany, June 4, 1964, M 61,241
8 Claims. (Cl. 321—11)

ABSTRACT OF THE DISCLOSURE

A high voltage rectifier comprising a series of rectifier elements axially arranged within a tube composed of an insulating material having a dielectric constant of at least 1000, and a pair of conductive discs covering the ends of the tube and in electrical contact with the end terminals of the rectifier assembly to form a capacitor that equalizes the voltage distribution along the rectifier assembly and simultaneously shields same from the effects of external fields.

---

This invention relates to a high voltage rectifier composed of a plurality of rectifier elements connected in series, sometimes referred to as a "rectifier column," and preferably comprising semiconductor rectifier elements.

To rectify alternating voltages of approximately 50 to 500 kilovolts, it is known in high-voltage engineering to connect a large number of semiconductor rectifier elements in series. If the maximum permissible cut-off voltage for a semiconductor layer of silicon has a peak value of, for example, 600 volts, and if rectification of an alternating voltage having a peak value of 100 kilovolts is desired, a rectifier required therefor must comprise approximately 230 rectifier elements. A known circuit shown in FIGURE 1 of the drawing comprises an unipolar high-voltage transformer 2 which is connected to ground at 1. To the output terminals of the transformer there is connected a series-combination of rectifiers 3 and a capacitor 4 which serve for smoothing. The rectifier in this circuit has unavoidable capacitances relative to ground, which are of the order of magnitude of 30 pf. per metre length of the rectifier if the rectifier is arranged, for example, in an oil bath. These capacitances are shown in dashed lines as partial capacitors 5. In high voltage circuits, due to the unavoidable stray capacitances relative to ground, fairly large displacement currents occur, especially in rectifier elements located close to the transformer as a result, the current flowing through the rectifier elements may rise to the breakdown or Zener region and cause deterioration of the elements. The dependency of the corresponding alternating voltage U upon the parameter $x$ of the length of the rectifier column is shown in FIGURE 2.

Furthermore, there is the risk that adjacent live structural elements, for example, the associated high-voltage transformer, may cause capacitive displacement currents to be transferred to the rectifier column. These currents considerably interfere with the desirable linear division of voltage, along the rectifier column and also give rise to an additional load and hence, under certain conditions, to deterioration of one of the parts thereof.

To eliminate these disadvantages, several circuits and constructions have been suggested. Thus, for example, the rectifier column has been arranged in a tubular housing having a wall in the form of a series of shunting capacitors. This is effected by placing conductive rings in sections in the wall made of insulating material. Predominantly interfering alternating fields are shielded by means of said device.

In other arrangements, a metal screen is arranged over the rectifier column at the input and is connected to the input terminal thereof. Said screen constitutes a capacitor relative to ground potential having a capacitance per unit length which decreases in the direction of the parameter $x$ of the rectifier column. The screen produces a favourable influence on the distribution of the harmful alternating voltage throughout the length of the rectifier column. The shielding is still very incomplete, however.

It is also known to connect voltage-dependent resistors in parallel with the rectifier elements. These resistors, because of their characteristics, provide protection of the individual elements from overload.

All of these solutions have disadvantages, however. Either only the load caused by the stray capacitances is divided more uniformly over the rectifier elements, or the interfering external fields only are shielded. Furthermore, the housing-like shielding devices are complicated of construction and hence the manufacture thereof is technically difficult and expensive.

The present invention provides an arrangement which is simple to manufacture and in which said disadvantages are eliminated, while combining the advantages of the individual known arrangements. According to the invention, this is achieved by arranging all of the rectifier elements in a tube of insulating material having a high dielectric constant. The tube constitutes, together with two disc-shaped connecting pieces of the series-connected rectifier elements, a capacitor which is shielded against external fields and also decreases the unequal load on the rectifier column relative to alternating voltage, which is determined by the stray capacitance.

It is especially advantageous to use for the tube ceramic material having a dielectric constant $\epsilon$ between 1,000 and 5,000 so that a homogeneous field which extends in parallel with the rectifier column is adjusted in the dielectric. This ensures a linear voltage variation throughout the length of the rectifier column. According to the invention, a very high degree of shielding of the rectifier column relative to external fields is thus obtained.

In order that the invention may be readily carried into effect, several embodiments thereof will now be described in detail, by way of example, with reference to the accompanying diagrammatic drawings, in which.

Figure 1:
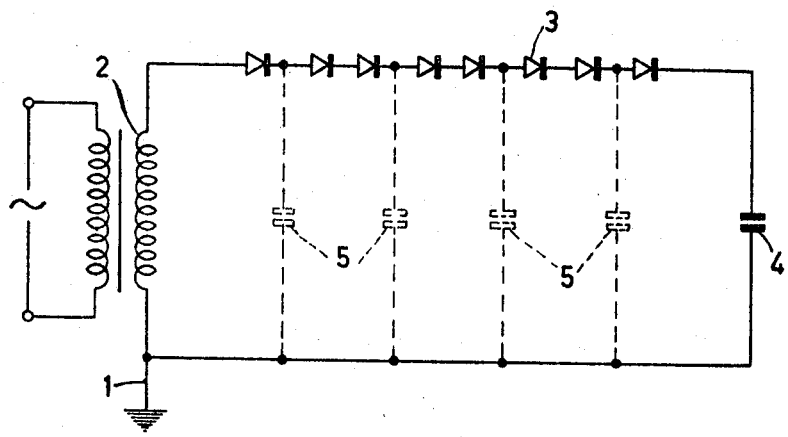
Figure 2:
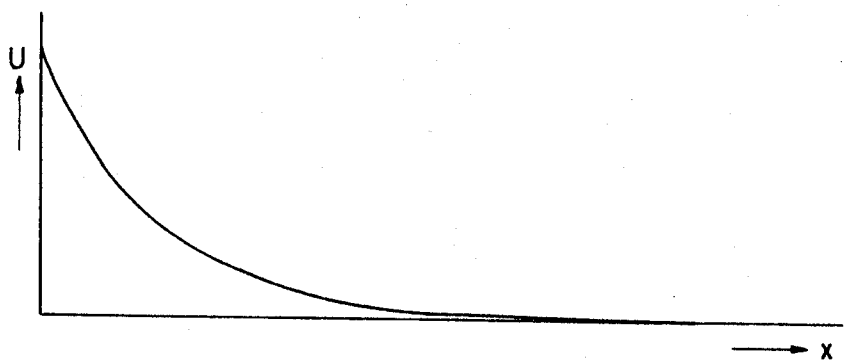
Figure 3:
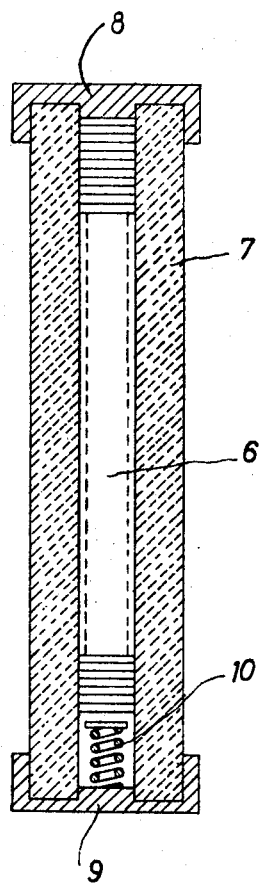
FIGURE 3 shows a shielded high voltage rectifier having a cylindrical tube.

In FIGURE 3, a rectifier column 6 is surrounded by a tube 7 which is made of a ceramic material having a high dielectric constant. Connecting caps 8 and 9, which also serve as electrodes of the capacitor, make contact with the rectifier column directly at one end and through a compression spring 10 at the other end.

Figure 4:
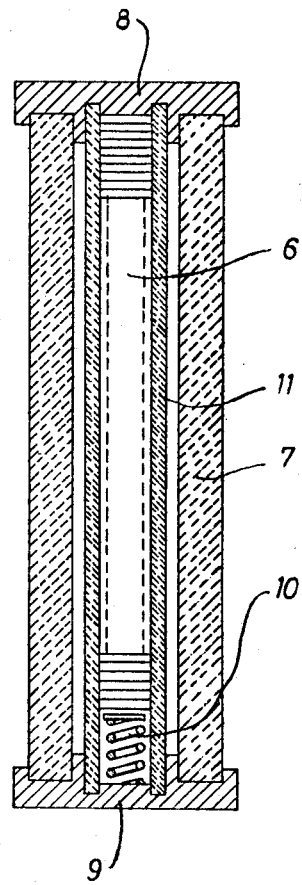
FIGURE 4 shows a shielded high voltage rectifier having a cylindrical tube and an insulating layer around the rectifier column.

Since, for reasons of voltage insulation, the rectifier column is usually arranged in a vacuum-tight manner or in an oil bath, it is preferable, as shown in FIGURE 4, to surround the rectifier column with a layer 11 of additional insulation. This layer may be, for example, in the form of a ceramic tube having a low dielectric constant.

Figure 5:
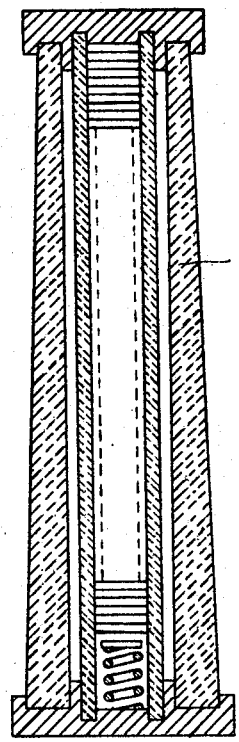
FIGURE 5 shows a shielded high voltage rectifier having a conical tube and an insulating layer around the rectifier column.

In another embodiment of the invention, the tube of ceramic material is shaped into an external form which ensures a more uniform distribution of the capacitances relative to ground along the rectifier column. In FIGURE 5, the outer wall of the tube is given a conical shape so that the tube 7' has a diameter which is larger at the end of the rectifier column which is adjacent the transformer then at the opposite end.

Figure 6:
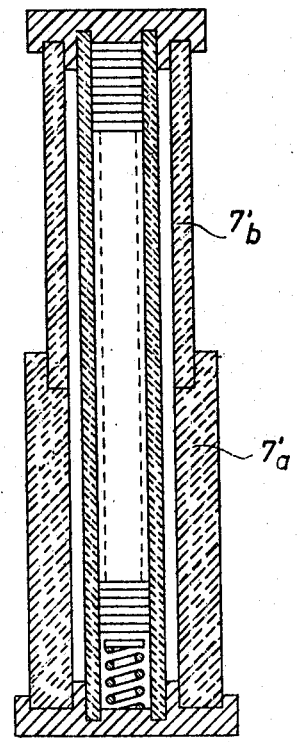
FIGURE 6 shows a shielded high voltage rectifier having two cylindrical tubes of different diameters and approximately half the length of the rectifier column and an insulating layer around the rectifier column.

A simplified embodiment of this kind may be obtained if, instead of using a tube having a conical external diameter, two tubes 7'a and 7'b are used, as shown in FIGURE 6. In this case, each tube, for example, is half the length of the rectifier column and one tube has a diameter which is smaller than that of the other.

Another advantage of the invention consists in that the ceramic tube, upon occurrence of excess voltages, especially with short rise times, acts as a capacitive impedance which is located in parallel with the rectifier column and protects the rectifier from excess load. In other words, the tube 7 in combination with the caps 8 and 9 form a shunt capacitor that provides surge protection upon the occurrence of high voltage transients.

The embodiments of the invention in which an exclusive property or privilege is claimed are defined as follows:

1. A high voltage rectifier assembly comprising a cylindrical tube composed of an insulating material having a dielectric constant of at least 1000, a plurality of rectifier elements assembled in series within the tube and extending along the tube axis, a pair of electrically conductive disc-shaped members mounted on either end of said tube and making electrical contact with the end terminals of the rectifier assembly, said pair of disc-shaped members and said tube together forming a capacitor that provides the sole means for equalizing the voltage distribution along the rectifier assembly.

2. A rectifier as described in claim 1 wherein said tube is composed of a ceramic material and wherein the outer diameter of each of said disc-shaped members is at least equal to the outer diameter of said tube thereby to completely cover both ends of said tube.

3. A rectifier as described in claim 1 further comprising a second tube composed of an insulating material having a relatively low dielectric constant and coaxially arranged within said first tube and surrounding said rectifier elements.

4. A rectifier as described in claim 1 wherein said tube has a conical shape.

5. A rectifier as described in claim 1 wherein said tube comprises first and second axially aligned and mating tubes having equal inner diameters and unequal outer diameters.

6. A high voltage rectifier assembly comprising a tube composed of an insulating material having a dielectric constant of at least 1000, a plurality of rectifier elements assembled in series within the tube and extending along the tube axis, a pair of electrically conductive disc-shaped caps covering both ends of said tube and making electrical contact with the end terminals of the rectifier assembly, said pair of caps and said tube together forming a capacitor effectively connected in parallel with said rectifier assembly, said capacitor being the sole means for equalizing the voltage distribution along the axis of the rectifier assembly.

7. A rectifier as described in claim 6 further comprising a metal compression spring confined between and in electrical contact with one of said caps and the adjacent end terminal of the rectifier assembly.

8. A high voltage rectifier assembly comprising a plurality of semiconductor rectifier elements assembled in series, and means for equalizing the voltage distribution along said rectifier assembly comprising, a tube composed of an insulating material having a high dielectric constant and axially surrounding said rectifier elements, and a pair of electrically conductive disc-shaped caps covering the ends of said tube and making electrical contact with the end terminals of the rectifier assembly, said pair of discs and said tube together forming capacitance means effectively connected in parallel with said rectifier assembly, said capacitance means providing the sole means for equalizing the voltage distribution along the rectifier assembly.

References Cited
UNITED STATES PATENTS

| | | | |
|---|---|---|---|
| 2,922,091 | 1/1960 | Parrish et al. | 317—234 |
| 3,319,136 | 5/1967 | Perry et al. | 317—234 |
| 2,853,656 | 9/1958 | Dowds | 317—101 |
| 3,128,421 | 4/1964 | Skellett | 321—11 |
| 3,242,412 | 3/1966 | Diebold | 321—11 |
| 3,278,826 | 10/1966 | Walker | 321—8 |

LEE T. HIX, *Primary Examiner.*

G. GOLDBERG, *Assistant Examiner.*